United States Patent Office 2,731,463
Patented Jan. 17, 1956

2,731,463

MANUFACTURE OF CYCLONITE

Werner E. Bachmann, Ann Arbor, Mich., Edward L. Jenner, Wilmington, Del., and Lawrence B. Scott, Emeryville, Calif., assignors to the United States of America as represented by the Secretary of War No Drawing. Application March 19, 1947,
Serial No. 735,820

6 Claims. (Cl. 260—248)

The invention described herein may be manufactured and used by or for the Government for governmental purposes without the payment of any royalty thereon.

The present invention relates to the preparation of high explosives and more particularly to an improvement in the so-called "combination process" for the manufacture of cyclonite.

Cyclonite (cyclotrimethylenetrinitramin) having a molecular formula of $C_3H_6O_6N_6$ and also known as Hexonite, RDX (B) Hexogen, $T_4$ and $C_6$, has heretofore been produced by the "Combination Process" wherein a heximine compound is treated with an ammonia yielding substance and nitric acid in the presence of an anhydride of a volatile fatty acid, such as acetic anhydride. Examples of this process are contained in applications for patent Serial Number 495,079 for a Method of Treating Reaction Mixtures and Serial Number 495,078 for a Method of Preparing Explosives, both of which applications were filed July 16, 1943, in the name of Werner E. Bachmann.

The principal object of the present invention is to improve on the aforementioned combination process for producing a larger percentage yield of cyclonite from the reaction mixture than that previously obtainable under normal operating conditions.

A still further and important object of the invention is to enhance the solubility of the ammonia yielding compound in the reaction mixture during the production of the cyclonite.

In the manufacture of cyclonite employing the combination process the maximum yield of cyclonite has been charted at 86.92% while employing the reactants in the following quantities:

Hexamine=31.61 g.=1.00 mole
Ammonium nitrate=54.7 g.=3.03 moles
Nitric acid=63.0 g.=4.43 moles
Net acetic anhydride=154.0 g.=6.70 moles.

In carrying out the above production of cyclonite a heel consisting of one gram of oven-dried, finely powdered ammonium nitrate, 26 grams of acetic acid and 1.4 grams of ammonium nitrate in nitric acid was prepared by stirring the reactants while at a 70–75° C. temperature. To this an addition of 83.44 grams of hexamine in acetic acid, 117.05 grams of ammonium nitrate in nitric acid, and 160.08 grams of acetic anhydride was made over a 25 minute period while maintaining the reaction temperature at 65°±0.5° C.

It has been discovered that by adding 3.1 grams (0.2 mole) of oven-dried C. P. lithium nitrate to a heel similar to that previously described and then concluding with the addition that a 87.1% yield of cyclonite was obtained. With the lithium nitrate in the heel it was observed that the reaction mixture was completely clear during the first part of the addition definitely indicating that the presence of the lithium nitrate increased the solubility of ammonium nitrate in the reaction mixture.

To further increase the yield of cyclonite under condition similar to that above described it was conceived that in the presence of a large excess of ammonium nitrate, the lithium nitrate would have a beneficial influence on the yield. This was proved by a series of runs using the following quantities of reactants:

Hexamine=31.61 g.=1.00 mole
Lithium nitrate=40.0 g.=2.58 moles
Ammonium nitrate=70.0 to 74.0 g.=3.93 to 4.10 moles
Nitric acid=58.3 to 63.0 g.=4.10 to 4.43 moles
Acetic anhydride (net)=154.0 g.=6.7 moles.

The heel in each run was prepared in a manner similar to that previously described except that 15.0 grams of lithium nitrate and 10.0 grams of ammonium nitrate were employed while the balance of these reagents were included in the addition with the 25 grams of lithium nitrate being added after one-fifth of the addition had been completed. A yield of cyclonite varying from 87.3% to 89.2% was obtained.

In carrying out the combination process without employing lithium nitrate the highest yields of cyclonite were obtained using 4.4 to 4.5 moles of nitric acid. However, when using the supplementary salt the maximum yield occurred when using 4.25 moles of nitric acid. Thus a run using the aforementioned procedure and employing the following quantities of reactants yielded 90.0% cyclonite:

Hexamine=31.61 g.=1.00 mole
Ammonium nitrate=75.08 g.=4.16 moles
Nitric acid=60.43 g.=4.25 moles
Acetic anhydride (net)=150.4 g.=6.7 moles
Lithium nitrate=40.0 g.=2.58 moles.

In the foregoing examples, a hexamine derivative such as a hexamine salt may be substituted for the hexamine (hexamethylenetetramine) referred to therein and similarly other ammonia yielding substances can be used in place of the ammonium nitrate. Also other anhydrides of a volatile fatty acid can be used in place of the acetic anhydride.

Further the reactions as described are of a pseudo-continuous character while commercial production is more favorably carried out under a continuous process wherein the reactant solutions acetic anhydride, hexamine in acetic acid and ammonium nitrate in nitric acid are simultaneously introduced at constant rates into a continuous reactor where they are rapidly circulated with vigorous agitation. However, the quantities of reactants employed in the addition stage only of the aforementioned examples can be used in carrying out a continuous process for commercial manufacture of the cyclonite when desired, as the addition stage of the pseudo-continuous process is identical with the continuous process.

The solutions referred to herein were prepared as follows:

a. Hexamine in acetic acid—a solution prepared by dissolving 638.4 g. of hexamine in 1 liter of 99.85% acetic acid.

b. Ammonium nitrate in nitric acid—a solution prepared by dissolving 184 g. of oven-dried ammonium nitrate in 216 g. of absolute nitric acid.

c. Acetic anhydride—a 98% solution.

The term "mole" has been used exclusively in this specification to indicate "moles per mole of hexamine."

Although in the foregoing description the invention has been described in detail, it will be apparent that many variations may be made without departing from the basic inventive concept. Therefore, such modifications of the invention as come within the scope of the appended claims are deemed to be part of the invention.

We claim:

1. A process for obtaining a large percentage yield of cyclonite from the reaction mixture which consists in treating hexamine with nitric acid, acetic anhydride and lithium nitrate in the presence of a large excess of ammonium nitrate.

2. A process for obtaining a large percentage yield of cyclonite from the reaction mixture which consists in simultaneously intermixing hexamine in acetic acid, a large excess of ammonium nitrate in nitric acid, acetic anhydride and lithium nitrate.

3. A process for obtaining a large percentage yield of cyclonite from the reaction mixture which comprises the mixing of one mole of hexamine, 3.93 to 4.10 moles of ammonium nitrate, 4.10 to 4.43 moles of nitric acid, 6.7 moles of acetic anhydride and 2.58 moles of lithium nitrate.

4. An improvement in processes for producing cyclonite consisting in preparing a heel by mixing ammonium nitrate, acetic acid, ammonium nitrate in nitric acid and lithium nitrate and mixing with said heel an addition consisting of hexamine in acetic acid, a large excess of ammonium nitrate in nitric acid and acetic anhydride.

5. An improvement in processes for producing cyclonite consisting in preparing a heel by mixing ammonium nitrate, acetic acid, ammonium nitrate in nitric acid and lithium nitrate and mixing with said heel an addition consisting of hexamine in acetic acid, a large excess of ammonium nitrate in nitric acid, acetic anhydride and lithium nitrate.

6. An improvement in processes for producing cyclonite consisting in preparing a heel by mixing and stirring ammonium nitrate, acetic acid, ammonium nitrate in nitric acid and lithium nitrate together, maintaining the temperature of the mixture at 70–75° C. while mixing, introducing to said heel an addition consisting of hexamine in acetic acid, a large excess of ammonium nitrate in nitric acid, acetic anhydride and lithium nitrate, making the introduction of said addition gradually over a 25 minute period and maintaining the temperature of the reactants at 65°±0.5° C. during the introduction of said addition.

References Cited in the file of this patent
UNITED STATES PATENTS

| | | |
|---|---|---|
| 2,395,773 | Wyler | Feb. 26, 1946 |
| 2,434,230 | Schiessler | Jan. 6, 1948 |

OTHER REFERENCES

110 Meeting Amer. Chem. Soc., Sept. 13, 1946, p. 31M.